United States Patent [19]
Brink

[11] 3,907,502
[45] Sept. 23, 1975

[54] METHOD FOR IDENTIFYING BENCE JONES PROTEINS

[76] Inventor: Miless L. Brink, 1050 Holland St., Lakewood, Colo. 80215

[22] Filed: Dec. 11, 1973

[21] Appl. No.: 423,829

[52] U.S. Cl. ............................. 23/230 B; 424/12
[51] Int. Cl.² ................ G01N 33/16; G01N 31/02
[58] Field of Search ..................... 23/230 B; 424/12

[56] References Cited
OTHER PUBLICATIONS
Am. J. Clin. Path., V. 44, pp. 413–415, (1965).
J. Lab. Clin. Med., V. 76, pp. 973–980, (1970).
Chem. Abstr., V. 54:4690f, (1960).
Chem. Abstr., V. 16:729, (1922).

*Primary Examiner*—Morris O. Wolk
*Assistant Examiner*—Timothy W. Hagan
*Attorney, Agent, or Firm*—C. B. Messenger

[57] ABSTRACT

A method for the detection, typing and quantitative evaluation of Bence Jones proteins in biological fluids wherein such fluids are combined with ammonium or sodium sulfates to an established saturation value before the fluids are centrifuged. The derived supernatant solution and other standardized antisera or control specimens are subsequently subjected to double or radial diffusion, electrophoresis or electroimmuno studies where characteristics of any Bence Jones proteins that are present are established.

8 Claims, 12 Drawing Figures

US Patent    Sept. 23, 1975    3,907,502
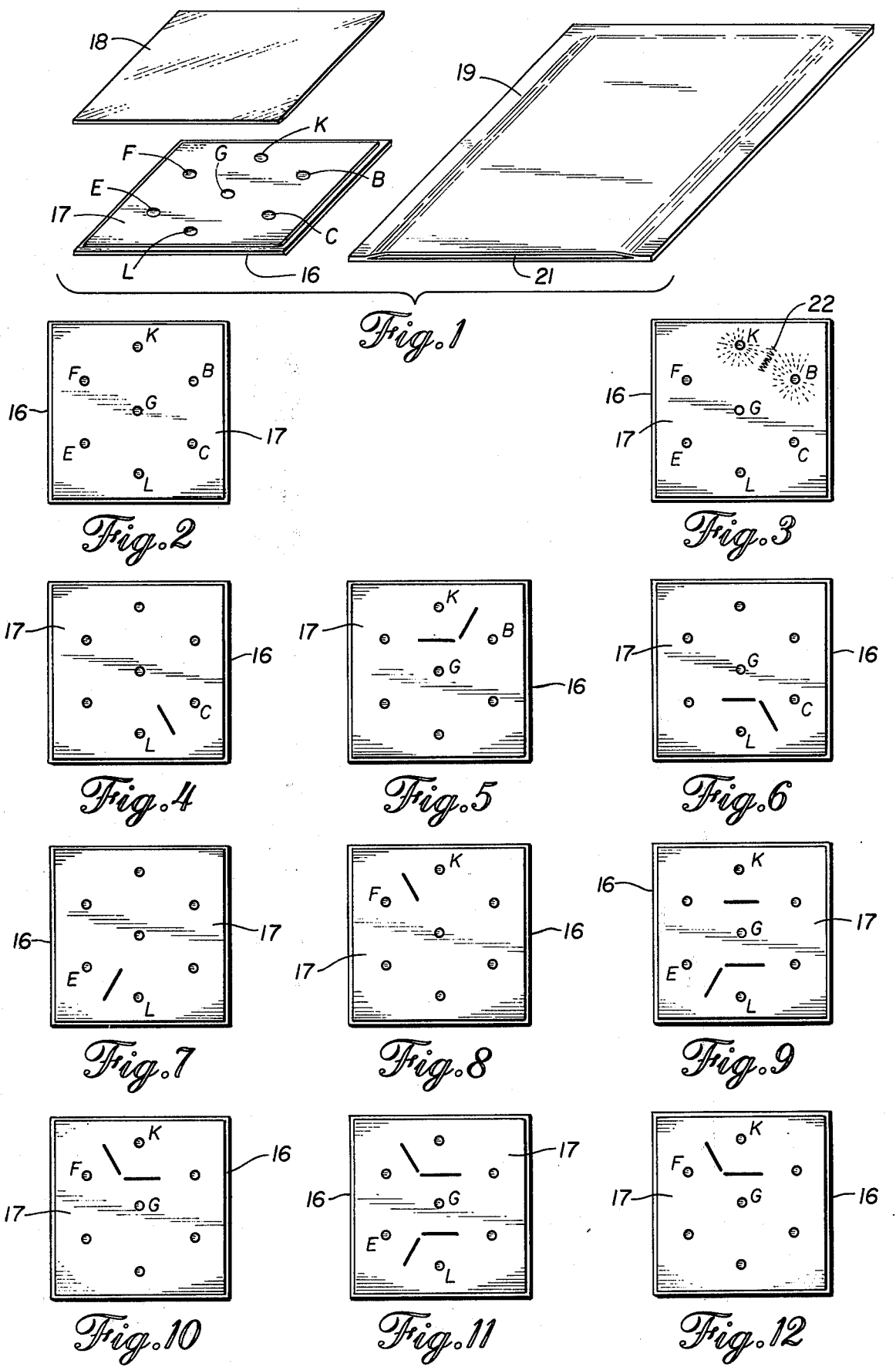

METHOD FOR IDENTIFYING BENCE JONES PROTEINS

BACKGROUND OF THE INVENTION

It has been recognized in the medical field that the presence of so-called Bence Jones proteins in body fluids is an indication of certain serious diseases, such as multiple myeloma. The laboratory testing procedures for determining the presence of such Bence Jones protein are relatively time consuming, and, accordingly, the tests are not always made in connection with general diagnostic procedures involving the testing of urine or other body fluids. Tests for the presence of Bence Jones protein in urine involve the use of acetic, nitric or other acids and heat. The precipitant derived in connection with such tests does not in itself identify the Bence Jones protein, which is of free light chain cellular structure sometimes occurring with bound light chains. If the specimen is heated to the boiling point and filtered, any Bence Jones protein in the filtrate will reappear when the specimen is cooled to 60° Centigrade. The specimen treating procedures, heating, cooling and filtration, etc., are time consuming, and, accordingly, a separate testing for the Bence Jones protein is not regularly made.

SUMMARY OF THE INVENTION

In the belief that a simpler testing procedure for free light chain proteins is advantageous, the present invention provides a method for detecting and evaluating Bence Jones proteins in various biological fluids. The testing method is based on the making of a centrifugal separation of bound and free light chain proteins after specimens containing such proteins in combination have been treated with certain solutions at prescribed temperatures and concentrations so that a differential combination with the bound and free light chain proteins is obtained. As the result of the differential affinity, the bound light chains assimilate a portion of the solution which is desirably of a specific gravity different from that of urine or the biological fluid being tested whereby the reacted bound light chains will be concentrated in the sediment of a centrifuged specimen, while the free light chain proteins remain in a supernatant component of the specimen. The supernatant fluid can then be directly tested by various diffusion and electroimmuno processes together with specific antisera or standardized control specimens to determine the presence, typing and concentration of the Bence Jones protein in the original biological fluid. Ammonium and sodium sulfates are among the solutions having differential affinities for bound and free light chain proteins, and these solutions have, accordingly, been found useful in connection with practice of the invention. For ammonium sulfate at room temperatures, a concentration range of approximately 45% to 60% is indicated, since at lesser concentrations adequate combination with the bound light chains is not established, while at greater concentrations the sulfate solution will combine with the free light chains in a similar manner, thus obviating the possibilities for centrifugal separation.

BRIEF DESCRIPTION OF THE DRAWINGS

FIG. 1 shows apparatus used in conjunction with one present method,

FIG. 2 is a top plan view of a test plate that may be used in practice of the invention, FIG. 3 is a top view illustrative of a first test result, and FIGS. 4 through 12 are schematic representations of the various test results possible in the practice of one method of the present invention.

DESCRIPTION OF THE PREFERRED EMBODIMENTS

A representative procedure in keeping with the present invention is in part illustrated by FIGS. 1–12. As seen in FIG. 1 a test plate 16 of plastic material or glass is provided. A thin layer of agar gelatin 17 is applied to the upper surface of said plate, and thereafter a plurality of small openings are cut through the gelatin to the surface of the plate thus providing a plurality of receptacles, such as the receptacles K and L. All of such receptacles are separately identified as shown in FIG. 2. After specimens and test samples have been prepared and applied to the plate in proper receptacle positions, a cover plate 18 may be brought into direct contact with the agar on the surface of the plate 16. Thereafter the sandwich package may be inserted through the opening 21 of a storage packet 19. Preferably the plate 16, cover plate 18 and the storage packet 19 are all transparent so the progress of diffusion processes can be directly observed.

Though the present method is adaptable for use in the testing of all biological fluids, the procedure illustrated in the accompanying Figures is beneficially used in connection with the testing of urine samples. The full steps of a urine testing method would include the following procedures. A portion of the direct urine sample is applied in the recess opening G. The remainder of the sample is treated with ammonium sulfate to establish a 50% saturation of ammonium sulfate in the urine. Thereafter test tubes of the sulfate treated sample are disposed in centrifuge apparatus to be rotated at 1,500 RPM for ten minutes. Samples of the supernatant solution derived from the centrifuge process are then disposed in the recess depressions E and F. Control samples known to contain kappa related chains of Bence Jones protein are disposed in recess B, and a control sample known to contain lambda related chains of the Bence Jones protein are disposed in the recess C. An antisera active against the kappa chains is disposed in the recess K, and an antisera active against the lambda chains is disposed in the recess L. Desirable antisera for both the kappa and lambda type proteins are available from the Meloy Laboratories of Springfield, Va.

With all the described specimens and test samples in their respective recesses, the cover plate 18 is positioned over the plate 16 and the agar materials disposed thereon to keep the samples from dehydrating. The entire sandwich assembly can thereafter be disposed within packet 19 to be held for a period of 12 to 24 hours. During such period the samples will have opportunity to diffuse outwardly from their respective receptacles, and if there is a reaction between any of the various samples, antisera and controls, an observable line of interference will be established in intermediate position between the respective recesses. FIG. 3 attempts to illustrate such a line of reactance between the receptacles K and B. A reaction along a line 22 in position between receptacles K and B indicates the presence of kappa chains in the control, and such line must be present to assure the validity and effectiveness of the kappa antisera.

FIGS. 4 through 12 illustrate diagrammatically the respective positioning of interference or reactance lines for various other test results. In FIG. 4 the line between the receptacles L and C indicates the presence of lambda chains in the control and must be present to assure the validity and effectiveness of the lambda antisera. In FIG. 5 a line positioned between receptacles K and G in addition to the characteristic line between K and B as discussed in FIG. 3 additionally confirms the presence of either bound or free kappa chains in the untreated urine. The line between the receptacles L and G in FIG. 6 is supplementary to the showing of FIG. 4, and it indicates the presence of bound or free lambda chains in the untreated urine. The presence of a line between the receptacles L and E as illustrated in FIG. 7 indicates the presence of free lambda chains in the supernatant component of the treated urine. The presence of a line between receptacles F and K indicates the presence of free kappa chains in the supernatant component of the treated and centrifuged urine.

The pattern shown in FIG. 9 indicates the presence of bound kappa and lambda chains and also the presence of free lambda chains. The pattern of FIG. 10 indicates the presence of bound kappa chains and also of free kappa chains. The pattern illustrated in FIG. 11 indicates the presence of bound kappa and lambda chains in the untreated specimen and also the presence of free kappa and lambda chains in the treated urine sample. FIG. 12 is illustrative of a verification check of the testing procedures that is possible in connection with practice of the method, since existence of a line between the receptacles F and K without a line between the receptacles K and G would indicate that some incorrect procedure had been followed. In other words, if there are to be free kappa chains in the treated urine sample, there must also be free kappa chains present in the untreated urine sample. Through practice of this described method, the presence or absence of Bence Jones proteins or free light chains having kappa and lambda characteristics can be established, and, accordingly, the presence or absence of various diseases in the patient can be determined.

The foregoing method is adaptable for use in connection with the testing of biological fluids other than urine so long as such fluids are treated in keeping with the present invention. Previously, testing for the Bence Jones protein has been dependent on the observation of a precipitant when urine samples treated with acetic acid are heated and cooled. Such testing does not directly establish the kappa or lambda characteristics, and the test is relatively more difficult than the test procedures possible in connection with practice of the present method.

Where urine or other biological fluids are to be tested in keeping with the present procedure, ammonium sulfate is used to bring the biological fluid solution to a 45% to 60% saturation with ammonium sulfate. The solution is then centrifuged. This process will cause the bound light chain proteins to be concentrated in the sediment of the centrifuged specimen. The Bence Jones or free light chain proteins will still be present in the supernatant solution after the ammonium sulfate treatment and the centrifuge separation steps.

It is also possible to obtain similar beneficial results when sodium sulfate is used in plate of ammonium sulfate. At room temperatures the concentration of sodium sulfate in the fluid specimen should be brought to approximately 18% to 21%. Where sodium sulfate is used, the actual percentage concentration must be closely regulated, since relative concentrations of sodium sulfate in aqueous solutions are quite sensitive to temperature changes. For this reason, procedures using ammonium sulfate are preferred.

The supernatant solution that is obtained through use of ammonium or sodium sulfate can be tested with various standard laboratory techniques to determine the presence of free light chain proteins and to type such proteins. Double diffusion processes can be used to measure the presence of such free light chains where antisera specific for such light chains are provided. Electrophoresis studies using a suitable antisera are also possible to identify the light chains present. The supernatant samples can also be typed by double diffusion or electrophoresis processes where antisera specifically identified for the kappa or lambda type free light chains is used. Concentration and strength studies of the treated solution can also be made by double diffusion processes with specific antisera for either the kappa or lambda type where various strength dilutions of the supernatant fluid are used against an antisera of controlled properties. Further, the relative concentrations can be determined where a single specimen is evaluated in a diffusion process where antisera disposed at equally spaced positions is of varied strength or where the antisera is placed at varied distances away from the test sample. Similar studies using various dilutions of the test sample or various strengths of antisera or various separation distances can give added strength, typing and other data when such processes are used with electrophoresis studies or other electroimmuno or diffusion processes.

I claim:

1. The method of identifying the presence of the free light chain proteins that characterize myelomas in biological fluids that may additionally include bound light chain proteins comprising the steps of treating said biological fluid with a solution having a differential reaction with respect to the defined free light chain proteins and said bound light chain proteins whereby the proportional weight of the reacted bound light chain proteins is changed, centrifuging the treated fluid whereby the heavier of said proteins is concentrated in the sediment of the centrifuged sample, and testing the supernatant component of said sample against known antisera for kappa and lambda types of myeloma proteins and/or control specimens to determine characteristics of said sample.

2. The method as set forth in claim 1 wherein the testing step includes the making of diffusion studies of the supernatant component of the centrifuged sample and said antisera.

3. The method as set forth in claim 1 wherein said sample is tested against control specimens identified with known kappa and lambda types of myeloma.

4. The method as set forth in claim 1 wherein said treating solution is a material selected from the group consisting of ammonium sulfate and sodium sulfate.

5. The method as set forth in claim 4 with the treating solutions being used at temperatures and concentrations wherein the differential reaction is obtained.

6. The method as set forth in claim 5 wherein the treating solution is sodium sulfate used at a reaction strength equivalent to a concentration of 18% to 21% at room temperature.

7. The method as set forth in claim 5 wherein said treating solution is ammonium sulfate used at a proportional concentration of 45% to 60%.

8. The method as set forth in claim 7 wherein said biological fluid and ammonium sulfate are used at room temperature.

* * * * *